(12) United States Patent
Obendorf

(10) Patent No.: US 6,405,209 B2
(45) Date of Patent: *Jun. 11, 2002

(54) TRANSPARENT OBJECT INSTANTIATION/INITIALIZATION FROM A RELATIONAL STORE

(75) Inventor: Michael Scott Obendorf, San Diego, CA (US)

(73) Assignee: NCR Corporation, Dayton, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/181,411

(22) Filed: Oct. 28, 1998

(51) Int. Cl.[7] .............................. G06F 17/00; G06F 7/00
(52) U.S. Cl. ........................ 707/103; 707/100; 707/1; 707/2; 707/3
(58) Field of Search ......................... 707/103, 1–3, 707/100

(56) References Cited

U.S. PATENT DOCUMENTS

| | | |
|---|---|---|
| 5,295,256 A * | 3/1994 | Bapat ........................ 395/500 |
| 5,386,564 A | 1/1995 | Shearer et al. |
| 5,398,336 A | 3/1995 | Tantry et al. |
| 5,437,027 A | 7/1995 | Bannon et al. |
| 5,504,906 A | 4/1996 | Lutoff |
| 5,905,987 A * | 5/1999 | Shutt et al. .................. 707/103 |
| 6,035,303 A * | 3/2000 | Baer et al. ................... 707/103 |
| 6,038,565 A * | 3/2000 | Nock .......................... 707/101 |
| 6,052,693 A * | 4/2000 | Smith et al. ................. 707/104 |
| 6,061,690 A * | 5/2000 | Nori et al. ................... 707/103 |
| 6,112,210 A * | 8/2000 | Nori et al. ................... 707/103 |
| 6,128,621 A | 10/2000 | Weisz |

* cited by examiner

Primary Examiner—Hosain T. Alam
Assistant Examiner—Cam-Y Truong
(74) Attorney, Agent, or Firm—Gates & Cooper

(57) ABSTRACT

A method, apparatus, and article of manufacture for instantiation and initialization of objects from a relational database. The relational database stores object and class identifiers and pointers or object assist columns to generate the object from relational database entries. The object assist columns are used to assist the relational database management system to point to template types of property entries for an instantiated object.

35 Claims, 4 Drawing Sheets

FIG. 3B

| CLSID | TableName |
|---|---|
| 12918E1A5AC390BA93... | "CDOMAIN" |
| 1291AE2A5AD456BA9A... | "CDIMENSION" |
| 1291F43A5AE8793A9C3... | "CATTRIBUTE" |

FIG. 4

```
244 — REPRESENT CLASS
      DEFINITION AS A TABLE IN
      THE RELATION DATABASE
              |
              v
      IDENTIFY ONE OR MORE
      METHODS OF CLASS
      DEDINITION ASSOCIATED  — 246
      WITH PROPERTY OF OBJECT
```

TRANSPARENT OBJECT INSTANTIATION/INITIALIZATION FROM A RELATIONAL STORE

BACKGROUND OF THE INVENTION

1. Field of the Invention

The invention relates in general to object persistence on computer systems, and more particularly, to a transparent object instantiation/initialization from a relational database.

2. Description of Related Art

In modern computer systems, relational databases are used to store large amounts of data. A Relational Data Base Management System (RDBMS) is utilized to control access to, storage in, and manipulation of data that is stored in the relational database. More recently, Object-Oriented Programming Systems (OOPS) have also been used more extensively to create a new programming environment for computer systems.

The merger of RDBMS and OOPS has proceeded slowly because of the large differences in approach to data storage and manipulation. Further, the large number of installations of RDBMS has slowed the progress of OOPS because of this incompatibility.

One of the major incompatibilities is that an OOPS has difficulties creating (instantiating) a new object from an underlying RDBMS, because the object types, which are described in a header file (typically written in C++), is language dependent and therefore cannot be used universally with an RDBMS. Since creation of instances is difficult, the data structure of the underlying program cannot be manipulated easily, creating slower systems and more possibilities for error.

It can be seen, then, that there is a need in the art for a method to bridge the differences between RDBMS and OOPS. Further, there is a need for a merged RDBMS/OOPS system to be able to create an instance of an object without specific knowledge of the object types. There is also a need for a merged RDBMS/OOPS system to be able to store an instance of an object.

SUMMARY OF THE INVENTION

To overcome the limitations in the prior art described above, and to overcome other limitations that will become apparent upon reading and understanding the present specification, the present invention discloses a method, apparatus, and article of manufacture for instantiation and initialization of an object from a relational database. The relational database is created with object assist columns within the database, and instances of the object are created using the object assist columns. The instance is then stored in the database itself.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to the accompanying detailed description, in which there is illustrated and described specific examples of a method, apparatus, and article of manufacture in accordance with the invention.

BRIEF DESCRIPTION OF THE DRAWINGS

Referring now to the drawings in which like reference numbers represent corresponding parts throughout.

FIGS. 3A and 3B illustrate an implementation of a relational database of the present invention; and FIG. 4 is a flowchart that illustrates exemplary logic performed by the initiator/instantiator according to the present invention.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes maybe made without departing from the scope of the present invention.

Overview

The present invention discloses a method, apparatus, and article of manufacture for instantiation and initialization of objects using a relational database. The object-relational bridge uses Application Programming Interfaces (API's) which are part of the Microsoft™ Common Object Model (COM) specification. Additional columns are used within the relational database to allow the invention to instantiate objects directly from the relational database.

The present invention uses a centralized repository for instantiation and initialization of in-memory objects from a RDBMS. The present invention also saves ("persists") existing objects to the underlying RDBMS. Objects which are ultimately persisted in Relational Tables are hereinafter referred to as "Persistent Objects".

All persistent objects must support dual interfaces IDispatch to provide late binding facilities to the repository for object initialization, and Custom to provide fast in process access to COM clients.

All persistent objects must support the IMetaPersist custom interface. This interface provides identifying characteristics for every object contained in the RDBMS. This interface provides access to at least two properties: ClassID, which uniquely identifies the Class Factory for an object, and ObjectID, which uniquely identifies an object within its relational table.

Persistent objects are instantiations of a class. The classes that define persistent objects are described within an RDBMS schema In general, each class definition is represented by a table, with each property in the class represented by a column in the table. Instances of the class (persisted objects) are then stored as relational tuples (rows in the table). Primary keys (ObjectIDs) support retrieval of unique instances; foreign keys and reference tables enable class relationships and collections.

Each property column in an object table is associated with two "object assist" columns. These columns furnish type information for the property and a late binding index for initialization of the property within an instantiated object. When objects are referenced from within an application, they must be instantiated from the repository.

Hardware Environment

Figure 1:
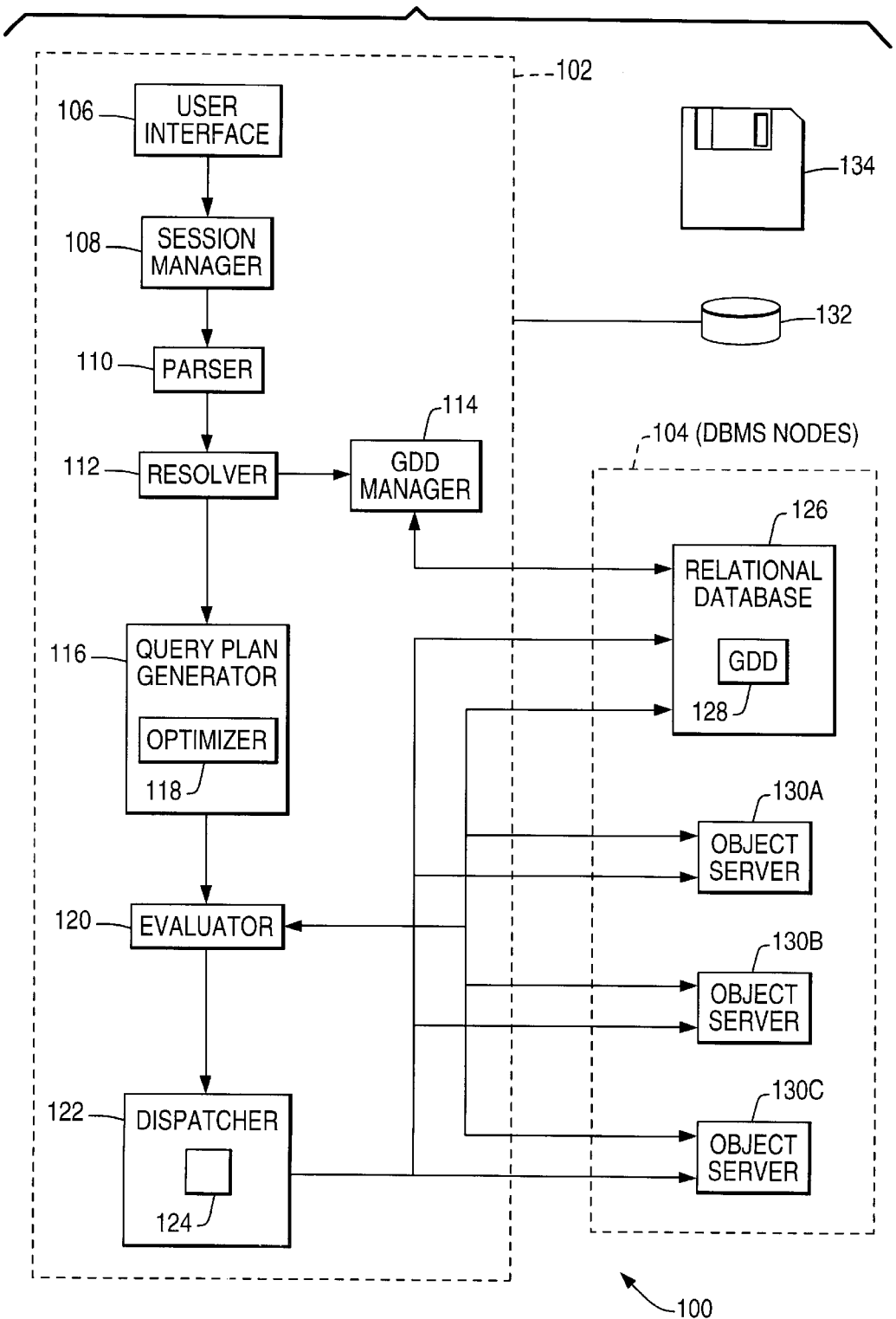
FIG. 1 is a block diagram that illustrates an exemplary hardware environment that could be used with the present invention.

FIG. 1 is a block diagram showing a hardware environment implementing one embodiment of the present invention. A computer device 102 and one or more DBMS nodes 104 typically implement the database management system 100 of the present invention. The computer 102 implements a user interface 106, a session manager 108, a parser 110, a resolver 112, a Global Data Dictionary (GDD) manager 114, query plan generator 116, optimizer 118, evaluator 120, and a dispatcher 122. The dispatcher 122 contains instantiator/initiator 124 of the present invention. DBMS nodes 104 may include one or more relational databases 126 that have one or more Global Data Dictionaries 128, and one or more object servers 130A, 130B, and 130C.

The user interface 106 translates computer messages into user-viewable results, and accepts client commands and translates those commands into computer interpretable instructions.

The session manager 108 creates a session that is used to communicate with the client, and assigns a session identifier. This session manager 108 handles incoming requests and sends back responses to the client.

The parser 110 checks the syntax of the client commands and uses a grammar definition to generate a high-level collection of object structures that will be later optimized and converted into a query execution plan. This is accomplished by defining language protocol classes (objects) that represent the parse tree. In one embodiment, these objects are defined according to the C++ protocol.

The parser 110 creates a link-list of attribute objects, table name objects, and predicate expressions for use by the resolver 112.

The resolver 112 receives the object structures from the parser, iterates over the object parse tree, and binds attributes and UDF invocations to object-relational tables and libraries. The resolver 112 also appends statistical, static cost, and historical usage information to the parse tree objects. This information is later used to optimize the query plan.

The resolver 112 also obtains statistical, static cost, and historical usage information from the Global Data Dictionary (GDD) 128, which is stored in the form of GDD tables in the RDBMS 126, and managed by the GDD manager 114. The GDD manager 114 also maintains a user-configurable and definable GDD cache that is updated when changes are made to the GDD 128. This is accomplished by spooling entries during data definition language (DDL) M-SQL operations or checking a time-stamp or version number associated with the GDD 128 tables. If a change has occurred, the GDD manager 114 updates the GDD 128 cache. The GDD 128 cache structure is subdivided into boundary areas that are allocated to a GDD 128 table whose values are replaced using a least recently used (LRU) algorithm This method decreases system response times and improves overall performance. The GDD manager 114 also checks the integrity of the entries in the GDD 128.

The plan generator 116 translates the optimized parse tree into a query execution plan. The optimizer module 118 optimizes and balances query plans. This is performed by writing functions that transform parse-tree objects into commands that can be understood by the component modules that will receive these commands.

The evaluator evaluates the query plan for accessing the RDBMS 126, and the dispatcher 122 distributes the commands to the RDBMS 126 and the object servers 130A–130C. For the RDBMS 126, these steps are in the structured query language, SQL. For the object servers 130, these steps are sent to an interface manager (IM) for evaluation. The dispatcher 122 also coordinates execution of the commands, and coordinates sending first-pass results from the commands to the requesting client.

In general, the object initiator/instantiator 124 comprises data and/or instructions which, when read and executed by the computer system 100, causes the computer system 100 to perform the steps for performing and/or using the present invention. Generally, the data and/or instructions are embodied in and/or readable from a device, carrier, and/or media. For example, the data and/or instructions can be embodied in and/or readable from a memory 132, data storage device, Application Specific Integrated Circuit (ASIC), remote devices coupled to the computer via a data communications device for downloading a file from a network to the computer as is done in client-server architectures and on the Internet, floppy diskettes 134, CD-ROM disks, or other magnetic, optical, electronic, or other storage media or devices that can be connected to and interpreted by the computer.

The exemplary environment illustrated in FIG. 1 is not intended to limit the present invention. Indeed, other alternative hardware environments may be used without departing from the scope of the present invention.

Thus, the present invention may be implemented as a method, apparatus, or article of manufacture using standard programming and/or engineering techniques to produce software, hardware, firmware, or any combination thereof. In addition, the term "article of manufacture" as used herein is intended to encompass in or accessible from any device, carrier, or media.

Relationships and Operation

Figure 2:
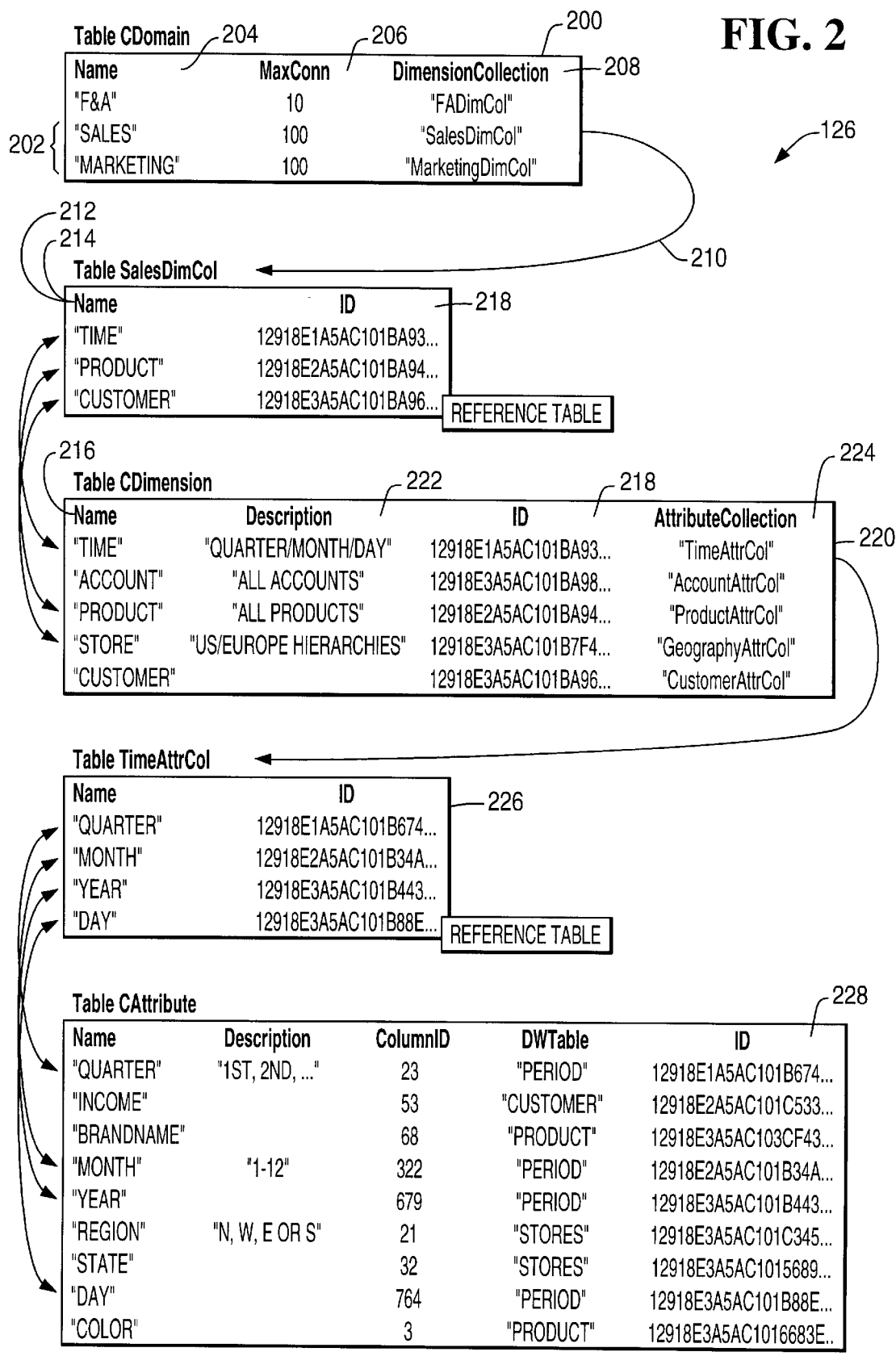
FIG. 2 illustrates entries in an relational database managed by an RDBMS.

FIG. 2 illustrates entries in an relational database managed by an RDBMS 126. Within a relational database, entries correspond to several attributes and are related to each other via relational tuples. Each row in the database is a relational tuple that describes the object.

As an example, a database managed by an RDBMS 126 is shown in FIG. 2 that describes typical entries in a sales database. Class CDomain 200 contains tuple 202 that describes the "sales" force for a given company. Within tuple 202, there are several attributes, name attribute 204, maximum connections (MaxConn) attribute 206, and dimension collection attribute 208. Dimension collection 208 is a pointer 210 to another portion of the RDBMS 126 that contains additional attributes associated with tuple 202.

Pointer 210 points from dimension collection 208 to table 212. Table 212 contains tuple 214, which has attributes name 216 and ID 218. Name 216 attribute is used to couple table 212 to other classes in the RDBMS 126.

Name 216 of table 212 is referenced to class Dimension 220 for additional description and qualities associated with name 216. For example, description 222 and Attribute Collection 224 are part of the tuple 202 associated with name 216. Attribute Collection 224 relates class CDimension 220 to table 226.

Table 226 provides additional information about name field 216. Table 226 is further defined in another class 228. This description method is shown for illustration purposes only, and is not meant to limit the present invention. Further, the number of tables and classes are not limiting to the present invention; larger or smaller numbers of tables, classes, or combinations of tables and classes are integrable with the present invention without exceeding the scope of the present invention.

The properties for class 200, class 220, and class 228 may be retrieved from the database, but without knowing the structure of the object, e.g., name field 204, it would be difficult if not impossible for the RDBMS 126 to actually populate an object with the relational tuple 202 containing that object's property values.

Figure 3A:
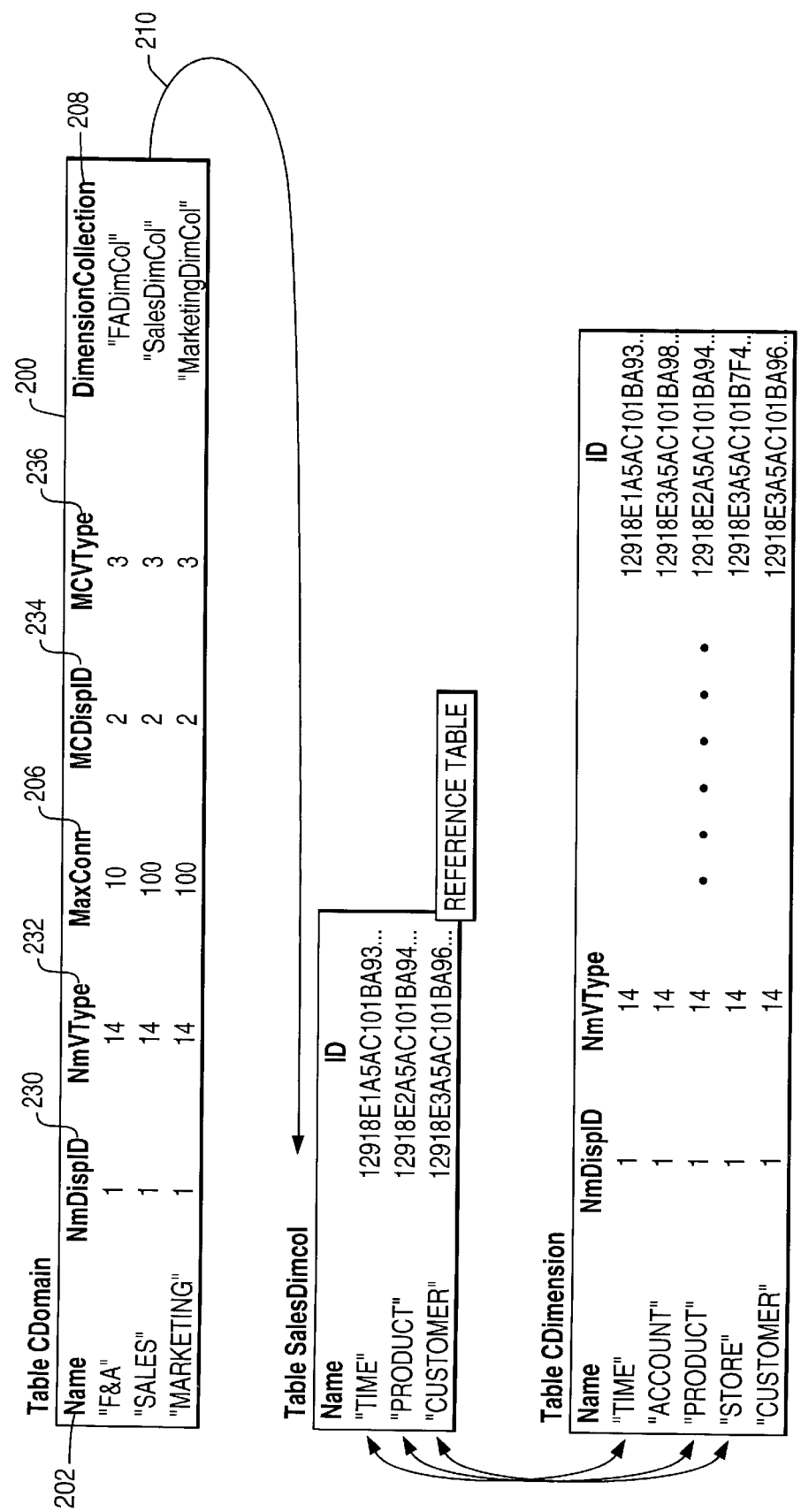

FIGS. 3A and 3B illustrate an implementation of a relational database of the present invention. Although class 200 contains relational tuple 202, name field 204, maximum connection field 206, and dimension collection 208, class 200 (and therefore relational tuple 202) also contains entries to assist the RDBMS 126 in instantiating and initializing objects. These entries, namely entries 230, 232, 234, and 236, are called object assist entries (or object assist columns in the database). An object assist column exists for each object property The creation of object assist entries 230–236 shifts the object description from a language dependent header file to an entry in the relational database where the objects are stored. Thus, the RDBMS 126 can now store not only the properties of the object, but the description of the class and/or instance of the object as well. To further assist the RDBMS 126 in instantiating and/or initializing the object, FIG. 3B illustrates a reference table 240 that maps class ID numbers 218 to table 242. Table 240 is used to instantiate an object from the RDBMS 126 by identifying the objects class factory, and thus constructor.

Object Creation—CoCreateInstance

When a client wishes to instantiate a persistent object of a given class, it may choose to create an empty object itself, or ask the RDBMS 126 to create the object on the client's behalf. If the client wants to create the object itself, it can create an object without regard to the RDBMS 126.

However, if the client requests object creation by the RDBMS 126 using the present invention, the client sends a ClassID 218 as an argument to the creation call. The ClassID is a 128 bit GUID as indicated in the Microsoft™ Common Object Module (COM) specification and is passed through to the COM API CoCreateInstance(). CoCreateInstance locates the class factory (and thus constructor) for the object associated with the ClassID 218 in table 240, loads the class factory into memory, and invokes the constructor corresponding to the ClassID 218, which creates the object in question.

Object Initialization—IDispatch

After successful object creation (whether an "empty" object was passed, or object creation was requested via a ClassID) the RDBMS 126 has an empty instance of the required class within the client's address space. The next step is to initialize the object from persistent data. The IDispatch interface that is implemented in every persistent object enables this initialization process. IDispatch furnishes an invoke() method, which uses a dispatch map (indexed table of function pointers) to late bind to property initialization methods within the persistent object. The repository will obtain the relational tuple 202 corresponding to the ObjectID and map each column value into the object, by using the "object assist columns" shown in FIG. 3A. These columns provide the invoke() dispatch index, and type information for the property being initialized from the database column.

As an example, object assist column 230 is passed to the invoke function, which used the entry (NmDispID=1) to locate the persistent object method that knows how to retrieve or set the object property. For example, to set the name 204 property of an entry (object) in class CDomain 200:

dispid=SQL (Select NmDispID from CDomain . . . )
//get the DispID for the Name property pDispatch- >
Invoke(dispid, . . . , DISPATCH_PROPERTYPUT,
<"putvalue"> . . . ) The call on the object through pDispatch requires that all persistent (saved) objects implement the IDispatch interface. In essence, the persistent object supplies a pointer to the IDispatch interface that is used by the RDBMS 126 to gain access to the Invoke method. This agreement ensures that the RDBMS 126 can initialize any persistent object without compile-time knowledge of the object's structure.

To retrieve an object from the RDBMS 126, the table 240 is used to recreate the object from the class ID. The pointers (object assist columns 230–236) associated with the class ID through tuple 202 recreate the object and the properties of the object upon recalling the object.

Logic of the Initiator

FIG. 4 is a flowchart that illustrates exemplary logic performed by the initiator/instantiator 124 according to the present invention.

Block 244 represents the computer 100 performing the step of representing a class definition as a table in the relational database, wherein an instance of the class is represented by a tuple of the table, a property of the instance is represented by a column of the table, and one or more object assist columns is associated with the property.

Block 246 represents the computer 100 performing the step of identifying one or more methods of the class definition associated with the property based on the object assist column.

Conclusion

This concludes the description of the preferred embodiment of the invention. The following describes some alternative embodiments for accomplishing the present invention. For example, any type of computer, such as a mainframe, minicomputer, or personal computer, could be used with the present invention. In addition, any software program utilizing (either partially or entirely) an RDBMS and/or object-oriented programming could benefit from the present invention.

In summary, the present invention discloses a method, apparatus, article of manufacture, and data structure for persistently storing objects in a relational database. A class definition is represented as a table in the relational database, where an instance of the class is represented by a tuple of the table, a property of the instance is represented by a column of the table, and one or more object assist columns are associated with the property. One or more methods of the class definition associated with the property based on the object assist column are identified.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of representing objects in a relational database, comprising representing a class definition as an object table in the relational database, wherein:

an instance of the class is represented by a tuple of the object table;

a property of the instance is represented by a column of the object table;

each property in the object table is associated with a first object assist column comprising type information for the associated property; and each property in the object table is associated with a second object assist column comprising a late-binding index for the associated property that is used to identify a late-binding method for getting or setting a value for the associated property within an instantiated object using the type information.

2. The method of claim 1, wherein the late-binding index in the second object assist column comprises a late-binding index used by a component object model iDispatch interface to locate the late-binding method.

3. The method of claim 1, wherein the late-binding method is a persistent object method.

4. The method of claim 1, wherein the late binding method comprises an initialization method for initializing the associated property within the instantiated object.

5. The method of claim 1, wherein the late-binding method maps the associated property from the column of the object table to the instantiated object.

6. The method of claim 1, wherein the late binding method comprises a retrieval method for retrieving the associated property from the instantiated object.

7. The method of claim 6, wherein the late binding method further comprises a persistent storage method for storing the retrieved property in the relational database.

8. The method of claim 1, wherein the type information in the first object assist column comprises a data type for the associated property.

9. The method of claim 1, further comprising:
  (a) instantiating an object from the class definition; and
  (b) initializing the instantiated object by:
    (i) retrieving a tuple from the object table; and
    (ii) invoking the method for each associated property using the first object assist column and second object assist column.

10. A device for representing an object in a relational database in a computer, comprising means, performed by the computer, for representing a class definition as an object table in the relational database, wherein:
  an instance of the class is represented by a tuple of the object table;
  a property of the instance is represented by a column of the object table;
  each property in the object table is associated with a first object assist column comprising type information for the associated property; and
  each property in the object table is associated with a second object assist column comprising a late-binding index for the associated property that is used to identify a late-binding method for getting or setting a value for the associated property within an instantiated object using the type information.

11. The device of claim 10, wherein the late-binding index in the second object assist column comprises a late-binding index used by a component object model iDispatch interface to locate the late-binding method.

12. The device of claim 10, wherein the late-binding method is a persistent object method.

13. The device of claim 10, wherein the late binding method comprises an initialization method for initializing the associated property within the instantiated object.

14. The device of claim 10, wherein the late-binding method maps the associated property from the column of the object table to the instantiated object.

15. The device of claim 10, wherein the late binding method comprises a retrieval method for retrieving the associated property from the instantiated object.

16. The device of claim 10, wherein the late binding method further comprises a persistent storage method for storing the associated property in the relational database.

17. The device of claim 10, wherein the type information in the first object assist column comprises a data type for the associated property.

18. The device of claim 10, further comprising:
  (a) means for instantiating an object from the class definition; and
  (b) initializing the instantiated object by:
    (i) means for retrieving a tuple from the object table; and
    (ii) means for invoking the method for each associated property using the first object assist column and second object assist column.

19. A program storage device, readable by a computer, tangibly embodying one or more programs of instructions executable by the computer to perform a method of representing an object from a relational database stored in a computer, the method comprising representing a class definition as an object table in the relational database, wherein:
  an instance of the class is represented by a tuple of the object table;
  a property of the instance is represented by a column of the object table;
  each property in the object table is associated with a first object assist column comprising type information for the associated property; and
  each property in the object table is associated with a second object assist column comprising a late-binding index for the associated property that is used to identify a late-binding method for getting or setting a value for the associated property within an instantiated object using the type information.

20. The program storage device of claim 19, wherein the late-binding index in the second object assist column comprises a late-binding index used by a component object model iDispatch interface to locate the late-binding method.

21. The program storage device of claim 19, wherein the late-binding method is a persistent object method.

22. The program storage device of claim 19, wherein the late binding method comprises an initialization method for initializing the associated property within the instantiated object.

23. The program storage device of claim 19, wherein the late-binding method maps the associated property from the column of the object table to the instantiated object.

24. The program storage device of claim 19, wherein the late binding method comprises a retrieval method for retrieving the associated property from the instantiated object.

25. The program storage device of claim 24, wherein the late binding method further comprises a persistent storage method for storing the retrieved property in the relational database.

26. The program storage device of claim 19, wherein the type information in the first object assist column comprises a data type for the associated property.

27. The program storage device of claim 19, the method further comprising:
  (a) instantiating an object from the class definition; and
  (b) initializing the instantiated object by:
    (i) retrieving a tuple from the object table; and
    (ii) invoking the method for each associated property using the first object assist column and the second object assist column.

28. A data structure stored in a memory for use in supporting object-relational databases, wherein the data structure comprises a relational database storing one or more tables representing one or more objects in one or more class definitions, wherein:
- an instance of a class is represented by one or more tuples stored in the one or more tables;
- a property of the instance is represented by one or more columns of the table;
- each property in the table is associated with a first object assist column comprising type information for the associated property; and
- each property in the table is associated with a second object assist column comprising a late-binding index for the associated property that is used to identify a late-binding method for getting or setting a value for the associated property within an instantiated object using the type information.

29. The data structure of claim 28, wherein the late-binding index in the second object assist column comprises a late-binding index used by a component object model iDispatch inteface to locate the late-binding method.

30. The data structure of claim 28, wherein the late-binding method is a persistent object method.

31. The data structure of claim 28, wherein the late binding method comprises an initialization method for initializing the associated property with the instantiated object.

32. The data structure of claim 28, wherein the late-binding method maps the associated property from the column of the table to the instantiated object.

33. The data structure of claim 28, wherein the late binding method comprises a retrieval method for retrieving the associated property from the instantiated object.

34. The data structure of claim 33, wherein the late binding method further comprises a persistent storage method for storing the retrieved property in the relational database.

35. The data structure of claim 28, wherein the type information in the first object assist column comprises a data type for the associated property.

* * * * *